United States Patent Office 3,264,356
Patented August 2, 1966

3,264,356
DICHLORO-DIFLUORO ETHER
Eric R. Larsen, Midland, Mich., assignor to The Dow Chemical Company, Midland, Mich., a corporation of Delaware
No Drawing. Filed Feb. 3, 1965, Ser. No. 430,189
3 Claims. (Cl. 260—614)

This application is a continuation-in-part of my copending applications Serial Numbers 389,486, filed August 13, 1964, now abandoned, and 830,207, filed July 29, 1959, and now abandoned; and of 803,818, filed April 3, 1959, the parent application of 830,207, and now abandoned.

This invention relates to a new, stable, 2,2-dichloro-1,1-difluoroethyl methyl ether useful as an inhalation anaesthetic, and a process for its preparation which differs critically from the process of the prior art by its inclusion of a step of oxidizing the product of the synthetic reaction substantially to eliminate toxic and unstabilizing impurities and to obtain a stable, purified product.

2,2-dichloro-1,1-difluoroethyl methyl ether is a compound named in the art, but has received relatively little investigation due to its supposedly unstable characteristics. Ethers of this type were reported by P. Tarrant and H. C. Brown in a 1951 issue of the Journal of the American Chemical Society, volume 73, page 1781, as being formed from the addition of straight chain alcohols to either trifluorochloroethylene, 1,1-dichloro-2,2-difluoroethylene, or 1,1-difluoro-2-chloroethylene. However, in this same article, the authors declared that 2,2-dichloro-1,1-difluoroethyl alkyl ethers were unstable at room temperatures, and possessed a decided tendency to decompose with liberation of hydrogen fluoride.

Other references directly pertinent to the subject ether are: British Patent 523,449; the University of Colorado, 1950 thesis by C. M. Snow, entitled "The Addition of Alkanols to Fluorinated Mono-Olefins," and "Physical Properties of Some 1,1-Difluoro-2,2-Dichloro-Ethyl Alkyl Ethers," by Park, Snow and Lacher, Journal of the American Chemical Society, volume 73, pages 861–2 (1951). This latter reference was based on the Snow thesis.

The British patentee, Gowland, at page 3, lines 50–54 discloses that 2,2-dichloro-1,1-difluoroethyl methyl ether is unstable, and further declares ". . . preferably the distillation is carried out in an inert atmosphere, since we find that the products are liable to oxidation in the presence of air."

C. M. Snow, likewise, conceded that 2,2-dichloro-1,1-difluoroethyl methyl ether was unstable. A considerable amount of his effort was directed to infrared spectrum analysis which concluded that the reaction product, presumed to be 2,2-dichloro-1,1-difluoroethyl methyl ether, exhibited a spectrum peak at about 5.95 microns. This physical characteristic has been reexamined with the surprising results disclosed hereinafter.

These views of Tarrant, Brown, Gowland, Park, Lacher and Snow, without exception, have either been endorsed or accepted without comment by subsequent writers dealing with the subject compound and its characteristics.

Supplementing these reports, it has been found by the present inventor that the reaction product, when prepared and separated by the means outlined in the prior art at room temperatures, liberates not only hydrogen fluoride as noted by Tarrant and Brown, but also hydrogen chloride, phosgene, and ethyl dichloroacetate. In various confirmatory tests, the separated reaction product, upon standing for about one week at room temperature, took on a distinct phosgene odor and fuming character with considerable etching of the glass bottle. These facts were not encouraging of utility.

However, it has been found by the present inventor that when 2,2-dichloro-1,1-difluoroethyl methyl ether was prepared and separated in the manner outlined by the earlier writers, a contaminant, hitherto unrecognized, remained in the separated reaction product. Although the present inventor utilized all known techniques of forming the pure compound by the methods described in the prior art, it was possible to form 2,2-dichloro-1,1-difluoroethyl methyl ether, separate, and avoid the contaminant. It has now been discovered to be an inherent phenomenon of the reaction process that when 2,2-dichloro-1,1-difluoroethyl methyl ether is formed and separated, small but significant quantities of the contaminant are present. The amount may vary somewhat, from perhaps 0.3 to 1 percent by weight of the whole preparation. Further, as will be disclosed hereinafter, the contaminant is responsible for the supposed instability and other undesired characteristics of the subject ether. When 2,2-dichloro-1,1-difluoroethyl methyl ether is formed substantially free from contaminants, it is stable for practically unlimited periods of time at normal storage conditions.

The present compound is regarded as "pure" when it manifests biological activity inherent to only itself, and when it has stability characteristics that permit its standing at room temperature without significant decomposition and without generation of toxic products, and any autocatalytic degradation takes place, if at all, at rates that cannot be detected upon prolonged standing, such as a year, at room temperature.

The past workers in this field did not separate and identify the ether which is the subject of this invention; but rather obtained two chemical compounds together, and erroneously believed that these two compounds, together, were one. Consistently these workers assumed the reaction product to be a purified form of 2,2-dichloro-1,1-difluoroethyl methyl ether. But, in fact, the product contained the subject ether with about 1 percent of the contaminant, now found to be 2,2-dichloro-1-fluorovinyl-methyl ether, the significance of which escaped detection.

Some confusion has existed as to the properties of the substance known now to be pure. The two best determinations of boiling temperature of the authentic compound have established it to be, variously, 104.8° C., with possible error of 0.2° C., or 104.65° C., both at 760 millimeters mercury pressure, absolute. The figures are compatible. The latter value is believed to represent the better determination. The related boiling temperature of 47.24° C. with possible error of 0.3° C. has been measured under 90.3 millimeters mercury pressure, absolute. The values as determined on the purest available substance are consistent within the limits of good laboratory practice. Sample purity is less a factor of error here than instrumentation.

The refractive index, $n$, of the substance as ascertained for the doublet D line of sodium light, considered to be of the wave length of 5893 A., was reported, in a patent application parent to the present specification, from a pure sample, to be 1.3858 as measured at 25° C. This figure represented an inadvertent misstatement of temperature at which the determination was made. At 25° C. the refractive index of the pure product of this invention is 1.3843, and at 20° C. the refractive index is 1.3858, either figure with neglible error ascribable to impurity, but possible inherent instrumental error of 0.0003 plus or minus. Thus the temperature dependence of the refractive index, $dn/dt$, is $2.8 \times 10^{-4}$ per degree C., within the indicated range. The correct values here stated are those of a product identical with that from which the earlier value, reported with an inappropriate temperature, was derived. The earlier determination had yielded the correct figure.

The specific gravity, $d$, of the pure compound of this invention was reported in a patent application parent to the present specification, from a pure sample, to have been 1.4279 when ascertained with the present compound at 25° C., and referred to water at 4° C. This figure represented an inadvertent misstatement of temperature at which the determination was made.

With the sample at 25° C., and referred to water at 40 C., the correct specific gravity of the pure product of the present invention, determined from the same sample as was reported before, is 1.4184. With the sample at 20° C., and referred to water at 4° C., the correct specific gravity of the said sample is 1.4279. In either figure, there is negligible error ascribable to product impurity, but possible inherent instrumental and operational error of about 0.0005 plus or minus. The earlier inadventence lay not in the determination of the value, or in the purity of product, or in the value itself, but solely in the recitation of temperature at which the determination was carried out. The prior determination had yielded a valid figure.

The impurity, 2,2-dichloro-1-fluorovinyl methyl ether boils at 101-103° C. at 760 millimeters mercury pressure, absolute; at 25° C. has a refractive index $n$ for the D line of sodium light of 1.4212, and a specific gravity at 25° C. of 1.3267 with reference to water at 4° C.

Various values have been published for the earlier supposedly separated 2,2-dichloro-1,1-difluoroethyl methyl ether now known to have been critically contaminated. These values include an atmospheric boiling temperature, reported variously, of 103–104.5 (Gowland), 104° C. (Park, Snow, and Lacher, 73 J. Am. Chem. Soc. 862), and 105° C. (Miller, Fager, and Griswold, 70 J. Am. Chem. Soc. 431).

Miller et al. state the $n^{20}D$ refractive index of their product to have been 1.3861, whereas Park et al., citing Miller et al. as their source, supply the $n^{25}d$ (sic) refractive index of 1.3864. Gowland gives "a refractive index ($N_D$) of 1.3387 at 17.5° C." In light of present knowledge a transposition of Gowland's characters seems to have occurred. The value of 1.3837 seems more probably correct.

Miller et al. state the $D_4^{20}$ specific gravity of their product to be 1.4262 whereas Park et al., as published, citing Miller et al. as their source, supply the $D_4^{20}$ specific gravity of 1.4226. Gowland gives "a density of 1.414 g./ml. at 17.5° C."

Thus, the refractive indices reported for the contaminated product of the literature leave the actual value in doubt, the inconsistency, perhaps representing the component portion of the most serious contaminant.

Any of the specific gravity values of the contaminated products, 1.4262 or 1.4226, both at 20/4, or 1.414 at 17.5, lies below the value for the pure ether, 1.4279 as does the value of the critical contaminant.

Various samples of the best product available, which is stable in air at room temperature for at least 3 years and of which the biological effects, in inhalation anaesthesia, are fully satisfactory, when analyzed by vapor phase chromatography, are found to contain from 9 to 12 different chemical substances. Of these, at least 999,000 parts, and usually about 999,700 parts per 1,000,000 parts by weight of whole product are the subject compound, 2,2-dichloro-1,1-difluoroethyl methyl ether. Of the remaining maximum of 1,000 parts, no other single substance is present in an amount greater than about 300 parts per million parts by weight of total product. Instrumental analysis which reliably indicates the presence of as little as ten parts 2,2-dichloro-1-fluorovinyl methyl ether per million parts of product fails to establish the presence of the said vinyl compound, in the purified product according to the invention.

A quantitative titration with a standardized 0.01 normal aqueous bromate-bromide solution (.2784 gram potassium bromate and 1.2 grams potassium bromide per liter) against standardized 0.01 normal sodium thiosulfate (2.5 grams sodium thiosulfate pentahydrate and 0.01 gram sodium carbonate per liter of water standardized against a KI-HCl known) using a small amount of potassium iodide as back-titration end-point indicator makes possible essentially replicable determinations of unsaturation. When all are calculated as 2,2-dichloro-1-fluorovinyl methyl ether, amounts on the order of 2 to 6 parts unsaturation expressed as said vinyl ether per million parts of 2,2-dichloro-1,1-difluoroethyl methyl ether are occasionally detected. Even though the unsaturation is calculated as the said vinyl ether, there is no evidence that this particular ether is actually present in any amount.

Repeated tests have established that, when impurities responding to this analytical method as unsaturation, calculated as though all were 2,2-dichloro-1-fluorovinylmethyl ether, represent not more than ten parts of the said fluorovinyl methyl ether per million parts 2,2-dichloro-1,1-difluoroethyl methyl ether purified according to the present invention, the product is entirely satisfactory as an anesthetic, and is stable to prolonged exposure to light and air.

In pusuit of purity of the desired degree, careful correlations have been made between results obtained by various analytical approaches. At a level of unsaturated impurity of 10 parts per million, all unsaturation being calculated as the said vinyl ether, there is highly reliable and essentially replicable correlation between results of said titration, vapor phase chromatography, high resolution infrared spectroscopy, shelf life, and physiological properties. At somewhat lower levels of unsaturated impurity, an infrared spectroscope that is adjusted to resolve to the degree necessary to show the impurity tends to "see" fine structure of the molecule as clearly as it sees the group frequencies involved, and thus to diminish rapidly in usefulness in the present assay. At similar, or moderately lower, concentrations of unsaturated impurity, peaks on the vapor phase chromatogram tend to become obscured under the spreading, lower reaches of adjacent component curves, and the vapor phase chromatogram diminishes rapidly in usefulness.

The end point of a titration remains distinct and useful, in the hands of a meticulous operator, to a value somewhat lower than either of the instrumental methods described above, and as an analytical tool, gives evidence of being the most precise. Amounts of unsaturated impurity as low as 3 parts per million parts, all by weight, of total product are detected with good reliability, although end point determination loses some of its replicability at two parts per million.

Shelf life tests, carried out either by holding samples of the compound in uncolored glass bottles at room temperature and under air, or accelerated such tests employing exalted temperatures and elevated pressures of air or oxygen, tend to confirm the results achieved by other tests, but tend to be somewhat more sensitive. Thus, a sample that has been held for a shelf life test, whether accelerated or normal, can easily be analyzed for acidity or other evidence of spontaneous breakdown. The accelerated and normal tests yield results that accord well with one another. This aging has the effect of magnifying the response to critical impurities through the autocatalytic acceleration of breakdown.

Hence, upon the basis of all present knowledge, analysis for decomposition products in a shelf life test, accelerated or not, is regarded as the most sensitive approach to assay of the purified product.

In every one of a large number of preparations of the substantially pure compound as herein described, when purity of product has been brought to the level hereinbefore described, not more than 1,000 parts impurity per million parts total product, no impurity more abundant than 300 parts per million; and unsaturation, all calculated as the said vinyl ether, less than 10 parts per million, the product has proved to be stable for five years actual elapsed time at room temperature and under air. How many years will elapse before breakdown is detectable is not known at the present time.

By "stable" is meant that careful analysis showed no acidity increase with elapsed time, the acidity assayed as hydrogen fluoride. Correspondingly, there is no detectable increase in unsaturation calculated as the said vinyl ether. Biological tests indicated essentially uniform efficacy as an inhalation anesthetic of products of any values within the range of impurities susceptible of analysis as above stated, within the limits defined.

A sample of 2,2-dichloro-1,1-difluoroethyl methyl ether was prepared by the process disclosed in the previously mentioned thesis by Snow. The reaction product was carefully separated from the reaction mixture and analyzed by infrared spectrum. A high spectrum peak was noted at 5.89 microns, thereby confirming Snow's report, and correcting his figures with benefit of a more modern instrument. 2,2-dichloro-1,1-difluoroethyl methyl ether was prepared in a method, disclosed hereinafter, that insures purity suitable for physiological use. Infrared spectrum of this product showed no peak at 5.89 microns. Further, and in like manner, a sample of the contaminant, 2,2-dichloro-1-fluorovinyl methyl ether, was prepared and subjected to infrared analysis, and it, as did the Snow product, displayed an infrared spectrum peak at 5.89 microns.

The effect of the presence of this contaminant is striking. When the subject ether is prepared in a manner known to the art, the contaminant is present in only small quantities, on the order of 3500 parts per million parts of product, but such quantities are sufficient to cause intolerable toxicity and noticeable instability after standing at room temperatures for about two weeks, with eventual, gross decomposition. This eventual decomposition is due to the fact that the contaminant, 2,2-dichloro-1-fluorovinyl methyl ether, is inherently unstable at room temperatures, and promptly breaks down to form acidic decomposition products including hydrogen fluoride. These acidic decomposition products serve to catalyze, or to react with, and decompose, 2,2-dichloro-1,1-difluoroethyl methyl ether at an accelerating rate of autocatalytic reaction as greater quantities of decomposition products become present in the ether solution. Once thus initiated, breakdown substances from the previously stable 2,2-dichloro-1,1-difluoroethyl methyl ether further autocatalyze the decomposition. The ultimate breakdown rate of the mixture tends to diminish. The resulting mixture is of great chemical complexity and is highly toxic upon inhalation.

However, in direct contrast, when the subject ether is prepared in the manner disclosed hereinafter, the isolated, essentially pure 2,2-dichloro-1,1-difluoroethyl methyl ether is sufficiently stable that, after being held at temperatures appreciably higher than room temperature for prolonged periods of time, it is impossible to detect hydrogen fluoride or other representative breakdown products therein.

2,2-dichloro-1,1-difluoroethyl methyl ether may be readily prepared in its preliminary impure form by slowly contacting methanol with 1,1-dichloro-2,2-difluoroethylene in the presence of strong alkali as a reaction mixture at temperatures from about −20 degrees centigrade to about 60 degrees centigrade for a contact time ranging from nearly instantaneous to about four hours, depending on factors such as the reaction temperature. The best temperature now known under industrial conditions is from 10° to 20° C.

The preparation of the crude product of the art, the precursor to the pure product of the present invention, is represented by the two equations:

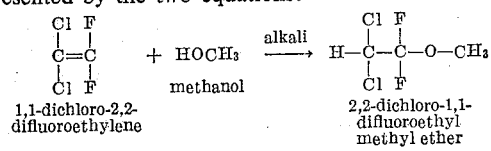
1,1-dichloro-2,2-difluoroethylene + HOCH₃ (methanol) → 2,2-dichloro-1,1-difluoroethyl methyl ether and

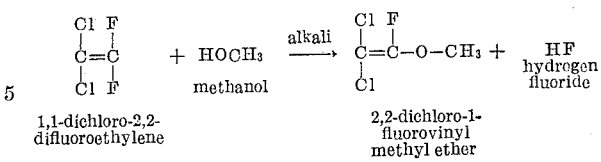
1,1-dichloro-2,2-difluoroethylene + HOCH₃ (methanol) → 2,2-dichloro-1-fluorovinyl methyl ether + HF (hydrogen fluoride)

Although the saturated and unsaturated products are always both produced, the product of the reaction represented by the equation first presented above is always much more abundant than that of the second.

In a preferred embodiment, the substance is prepared employing basic ion exchange beads as alkali.

A preparation in quantities determined by capactiy of small industrial equipment is carried out as follows:

Into a reactor equipped with agitator and temperature control jacket is charged approximately 100 pounds (about three pound moles) of methanol, technical. This methanol is used in exces, and so it is both a reactant and a solvent in the synthesis.

Approximately 1 U.S. gallon of ion exchange resin beads wet with methanol is then added to the methanol. This is in the hydroxide form with at least 0.7 milliequivalents OH⁻ per milliliter of wet beads.

Approximately 190 pounds of 1,1-dichloro-2,2-difluoroethylene (about 1.44 pound moles) is then added to the reactor and, within it, to the hundred pounds of methanol through a sparge pipe while the beads are kept in suspension by agitation. Coolant is run through the jacket of the reactor during this addition because the reaction is exothermic. The temperature in the reaction medium is kept at 10° to 20° C., to prevent side reactions and to minimize losses of the dichlorodifluoroethylene, which boils as 17° C. Reaction time is affected by the rate of heat removal and the reaction normally takes from 4 to 8 hours, using the stated quantities and conditions.

After the dichloro difluoroethylene is added, the resin is checked for residual alkalinity. If the resin is alkaline to phenolphthalein, it is assumed to have been of sufficient capacity and is removed from the CH₃OCF₂CHCl₂-methanol mixture. If it is not alkaline to phenolphthalein, additional resin is added to insure complete reaction.

Essentially the same procedure can be carried out, employing, as alkali, any strongly alkaline substance, such as caustic soda in methanol solution.

Control of the reaction rate may be accomplished by the rate of the addition of reactants and the amount of cooling applied to the reaction mixture. Agitation is employed to insure efficient contact of the reactants.

The foregoing method of etherification is merely one of the means whereby impure 2,2-dichloro-1,1-difluoroethyl methyl ether may be formed. Other techniques may be found in the literature.

After removal of the resin catalyst, the excess methanol is extracted out of the mixture using three separate water washes, suitably of 25 gallons each. The water layer is decanted off, leaving product as an immiscible organic layer, after each wash.

According to the present invention, 2,2-dichloro-1,1-difluoroethyl methyl ether containing intolerable unsaturated impurities may be purified and stabilized by a treatment with oxidizing agents such as air, oxygen, ozone, peroxy compounds, or other similar oxidizing agents, with subsequent removal of the decomposition or oxidation products and distilling if desired.

Thus the process of the present invention in one embodiment is defined in contacting methanol with 1,1-dichloro-2,2-difluoroethylene in the presence of a small amount of strong alkali; separating the reaction product; and, oxidizing said reaction product by passing oxygen therethrough thereby to produce stable 2,2-dichloro-1,1-difluoroethyl methyl ether. In another embodiment the proces of the present invention is defined in contacting methanol with 1,1-dichloro-2,2-difluoroethylene in the presence of a strong alkali; separating the reaction product; and, contacting said reaction product with ozone to produce stable 2,2-dichloro-1,1-difluoroethyl methyl ether.

The washing of unstable 2,2-dichloro-1,1-difluoroethyl methyl ether prior to oxidative treatment, by means of mixing the subject ether in repeated water washes or solutions of alkali carbonate and/or permanganate, has the sole function of removing gross amounts of impurities, and is in no way critical to the stabilization process. The alkali carbonate and permanganate wash may be either minimized or dispensed with entirely.

Oxidation of the impure 2,2-dichloro-1,1-difluoroethyl methyl ether according to the present invention, by the utilization of oxygen, may be performed in a number of ways. Bubbling elemental oxygen in its gaseous state through the ether is satisfactory. Passing the ether through a packed column counter-current to the elemental oxygen, or stirring the ether under an elemental oxygen atmosphere produce identical results. Extensive oxygenation, either with respect to contact time or contact volume, has no deleterious effect upon the stabilization process, but it has been determined that, depending upon oxygen flow rate, impurity concentration, and other factors, under the conditions employed, an interval of about one to about forty-eight hours treatment, is satisfactory. Shorter oxygenation periods than one hour with the apparatus and mixing methods available have failed to destroy completely the impurity or impurities responsible for the toxicity and ultimate lack of stability, probably because the oxygen contact with 2,2-dichloro-1,1-difluoroethyl methyl ether was incomplete due to contact difficulties inherent in dual phase reactions. Thus, oxygenation may be performed at any temeprature, pressure, or combination thereof, so long as intimate contacting may be maintained, with the contact time dependent upon the degree and manner of contacting of the reactants amount of impurity, and other routine factors. In the best mode now known, the ether is maintained predominantly in the liquid phase, during oxidative stabilization.

Means by which the reaction rate may be accelerated include the utilization of actinic radiation such as mercury vapor lamp radiation upon the reacting substances, namely elemental oxygen gas 2,2-dichloro-1-fluorovinyl methyl ether, and 2,2-dichloro-1,1- difluoroethyl methyl ether, during the aforementioned oxidation process. The use of actinic radiation is not critical, but merely serves the purpose of minimizing contact time while promoting complete oxidation. Thus actinic radiation may be utilized throughout the duration of oxygenation, or any part thereof, with reaction, acceleration achieved during those intervals when employed. Under optimum conditions, actinic radiation decreases reaction time by about one-half to one-third.

Another means of oxidizing consists of utilizing ozone as the oxidant in conjunction with air, oxygen, or other non-deleterious carrying gases. Ozonation, similar to oxygenation, may be carried out by bubbling ozonized air or oxygen through the ether solution, passing the impure ether through a packed column co-current or counter-current to the ozone, stirring the ether under an ozone atmosphere or any other means whereby adequate physical contact between the ether and ozone is attained. Because of the relatively high oxidizing and solubility characteristics of ozone, faster reaction sequences and reaction procedures are attained by the utilization of ozone. The time required to complete oxidation is substantially less when ozone is the reacting substance than when air or oxygen alone is used.

Actinic radiation and successive washing with aqueous alkali carbonate and permanganate may be employed with the ozonation in the identical manner as heretofore described in the oxygenation treatment. However, such ancillary techniques are considerably less helpful in conjunction with ozonation.

Illustratively, when the ozonation is put into practice, the freshly prepared and washed, and yet impure $CH_3OCF_2CHCl_2$, produced as described foregoing, is collected in a vessel fitted with a thermowell, a sparge pipe, a reflux condenser, and a coil for heating or cooling the contents. Coolant is put through the coil and an ozone-oxygen mixture is bubbled through the liquid by means of the sparge pipe. The impure $CH_3OCF_2CHCl_2$ is kept cool to increase the solubility of the ozone. Coolant is also run through the reflux condenser to minimize vaporization losses. Ozonation is best carried out at a temperature of 10° to 15° C.

The composition of the ozone-oxygen gas stream is 96 percent oxygen and 4 percent ozone.

After several hours of ozone addition, depending upon the olefin content, the $CH_3OCF_2CHCl_2$ turns blue indicating ozone in excess of the minimum needed for stabilization. The reaction proceeds for 4 hours to allow destruction of any oxidizable impurities; additional ozone is added as needed to assure that, terminally, an excess is present.

A sample of the $CH_3OCF_2CHCl_2$ is then checked by vapor phase chromatography analysis for destruction of $CH_3OCF{=}CCl_2$. Ozonization is continued until the concentration of $CH_3OCF{=}CCl_2$ is less than 10 parts per million.

The product of the oxidative treatment is at this point transferred to a still, heated to about 100°–105° C. and held at this temperature for about an hour to initiate the thermal decomposiiton of any residual peroxides and ozonides, and then it is distilled.

The distillation process is continuously monitored by repeated vapor phase chromatograms, while temperature is increased very slowly. Various low-boiling impurities are first removed, and a head cut comprising them is discarded continuously until the vapor phase chromatogram indicates that they have been essentially removed. A main product cut is then taken, continuously, until a vapor phase chromatogram indicates that initial traces of high boiling constituents are being distilled with the product. Distillation is discontinued at this point.

The main cut distillate is then thoroughly washed with aqueous caustic to neutralize any traces of acid, is repeatedly washed with water, and is dried by passage through a bed of anhydrous calcium chloride, and thereafter filtered. Anhydrous calcium sulfate and the like can be used instead of anyhdrous calcium chloride.

The product resulting from careful employment of the foregoing procedures manifests the useful properties and meets the specification as to purity, hereinbefore described. This embodies and exactly illustrates the best mode now known to the inventor to practice this invention.

2,2-dichloro-1,1-difluoroethyl methyl ether in its stabilized state is a clear, colorless, essentially non-combustible liquid with stability characteristics that permit its standing at room temperatures for unlimited periods of time without decomposition. The ether of the present invention has demonstrated utility in its stabilized form as a solvent of unusual merit and as a general inhalation anesthetic applicable to any inhalation anesthetic-susceptible organism.

The following examples are given to illustrate various processes for oxidizing to purify the compound of the present invention.

Example 1

A 500 milliliter sample of an impure 2,2-dichloro-1,1-difluoroethyl methyl ether product obtained from contacting methanol with 1,1-dichloro-2,2-difluoroethylene in the presence of a small amount of a strong alkali and separating, was washed in the following manner: (1) three separate 100 milliliter portions of 10 percent aqueous potassium carbonate solution, followed by (2) one 100 milliliter portion of 10 percent aqueous potassium carbonate solution with a few potassium permanganate crystals dissolved therein and finally (3) another three separate 100 milliliter portions of 10 percent aqueous potassium carbonate solutions.

A flask was charged with the washed ether and it was subjected to an excess of oxygen gas at a temperature ranging from about 35 to about 50 degrees centigrade. The method of oxygenation utilized consisted of stirring the ether solution in contact with an oxygen atmosphere for a period of about 36 hours, accompanied with actinic radiation by means of a mercury vapor lamp during only the initial 7 hours of oxygenation.

The oxygenated ether solution was further washed with aqueous potassium carbonate and potassium permanganate in the identical manner as heretofore described. Following this final washing process, the 2,2-dichloro-1,1-difluoroethyl methyl ether was dried by means of anyhydrous potassium carbonate and subsequently subjected to terminal dehydration with calcium oxide.

The dehydrated ether was then rectified through a 24 inch packed distillation column so as to separate the stabilized 2,2-dichloro-1,1-difluoroethyl methyl ether. Stabilization tests proved satisfactory upon samples taken (1) prior to distillation (2) forecut (boiling range between 42.0–42.7 centigrade degrees at 72 mm. pressure); (3) center cut (boiling point 42.7 degrees centigrade at 72 mm. pressure); and (4) pot residue and column holdup. Such stabilization tests consisted of placing the four distillation samples mentioned above and a sample of the unoxygenated 2,2-dichloro-1,1-difluoroethyl methyl ether in separate glass containers, and allowing the samples to stand at room temperatures from 20 to 25 degrees centigrade. The unoxygenated sample evidenced lack of stability within a short interval and carried the odor of phosgene, with glass etching apparent after about 4 days. After 6 months, the oxygenated samples still evidenced complete stability with no detectable decomposition.

*Example 2*

In another method of preparation, a free-falling liquid film reactor of sufficient length was utilized to allow a uniform film of crude 2,2-dichloro-1,1-difluoroethyl methyl ether to pass down the inner wall of the reactor and through the reaction zone in about three seconds. A solution of 2,2-dichloro-1,1-difluoroethyl methyl ether containing 0.78 mole percent of 2,2-dichloro-1-fluorovinyl methyl ether impurity, as determined by infrared spectrum analysis, was flowed through the film reactor while a stream of oxygen with 4 percent ozone was passed concurrently through the reactor. Room temperature and atmospheric pressure were utilized. Following reaction with three seconds contact time, infrared analysis showed the presence of 0.38 mole percent of 2,2-dichloro-1-fluorovinyl methyl ether in the ozonated solution. Conversion was 52 percent theoretical after the three second treatment.

Treatment in the foregoing manner can be extended to achieve any desired higher degree of purity.

The physiological effects of highly purified 2,2-dichloro-1,1-difluoroethyl methyl ether, as described herein, upon dogs, were tested in the following manner:

Two to three cubic centimeters of the stabilized ether were vaporized by passing oxygen over the surface of the ether and the resulting mixture administered to a normal, conscious dog by means of a common inhalation mask and anesthesis machine, in a procedure identical to human anesthetic inhalation procedure. Systemic arterial blood pressures were recorded in the usual manner. Following the initial dose of 2,2-dichloro-1,1-difluoroethyl methyl ether, an additional 9 to 10 cubic centimeters were administered over a period of about 55 minutes which maintained a clinically satisfactory state of anesthesia varying from moderate to deep; electroencephalographic tracings showed only slight changes in the electromotive potential measurements of the brain; electroencephalographic data reflected a normal sinus rhythm with an auricular-ventricular block common to anesthetic effects; and the blood pressure was normal under existing circumstances.

All of the foregoing physiological and anesthetic effects are considered to be substantially normal and typical of anesthetic administration, closely paralleling the results occurring from the widely used anesthetic, diethyl ether. In addition, however, 2,2-dichloro-1,1-difluoroethyl methyl ether has the added beneficial feature of being noncombustible under temperatures usually existing during anesthetic operations. Likewise, the vapor pressure of the subject ether is sufficiently high to produce deep anesthesia, but yet not high enough to permit possibility of over-dosage. Thus during the foregoing experiments with dogs, the vaporizer was allowed to remain fully opened throughout all phases of inhalation without overdosage occurring as would be expected with the present medicinal general anesthetic administered by means of inhalation. Vaporization took place in the presence of oxygen; however, 2,2-dichloro-1,1-difluoroethyl methyl ether may be vaporized with equal facility in the presence of a gaseous vaporization medium such as nitrogen, helium, carbon dioxide, air or other innocuous gases generally utilized with oxygen in anesthetic vaporization techniques.

Various modifications may be made in the present invention without departing from the spirit or scope thereof, and it is to be understood that I limit myself only as defined in the appended claims.

I claim:
1. 2,2-dichloro-1,1-difluoroethyl methyl ether being substantially free from 2,2-dichloro-1-fluorovinyl methyl ether, and having a boiling point of 47.24° C.±0.3° C. at 90.3 mm. pressure, a refractive index 20°/D of 1.3858, a refractive index 25°/D of 1.3843; a specific gravity 20°/4° of 1.4279, a specific gravity 25°/4° of 1.4184, and stability characteristics that permit standing at room temperature without significant decomposition.

2. The process which comprises: contacting methanol with 1,1-dichloro-2,2-difluoroethylene in the presence of a small amount of strong alkali; separating the reaction product; and, oxidizing said reaction product by passing oxygen therethrough thereby to produce stable 2,2-dichloro-1,1-difluoroethyl methyl ether.

3. The process which comprises: contacting methanol with 1,1-dichloro-2,2-difluoroethylene in the presence of a strong alkali; separating the reaction product; and, contacting said reaction product with ozone to produce stable 2,2-dichloro-1,1-difluoroethyl methyl ether.

References Cited by the Examiner

Miller et al.: Jour. Amer. Chem. Soc., vol. 70 (1948), pages 431–432.

LEON ZITVER, *Primary Examiner.*

BERNARD HELFIN, *Examiner.*